United States Patent [19]

Ellsworth et al.

[11] Patent Number: 6,131,113

[45] Date of Patent: Oct. 10, 2000

[54] MANAGING A SHARED RESOURCE IN A MULTI-PROCESSOR SYSTEM

[75] Inventors: Earle Ellsworth, Benson; Laura Hepner Evans, Tucson; Sangram Singh Ghoman, Tucson; Thomas Charles Jarvis, Tucson; Matthew Joseph Kalos, Tucson; Ralph O'Neill, Tucson, all of Ariz.; Lisa Phan, Austin, Tex.; David Brent Schreiber, Tucson, Ariz.; Brian Dewayne Watson, Cary, N.C.

[73] Assignee: International Business Machines Corporation, Armonk, N.Y.

[21] Appl. No.: 09/028,507

[22] Filed: Feb. 24, 1998

[51] Int. Cl.$^7$ .................................................. G06F 13/00
[52] U.S. Cl. ........................ 709/213; 709/214; 711/130; 711/147
[58] Field of Search .................................. 709/213, 214; 711/130, 147, 153, 173

[56] References Cited

U.S. PATENT DOCUMENTS

| | | | |
|---|---|---|---|
| 4,862,354 | 8/1989 | Fiacconi et al. ........................ | 709/216 |
| 5,485,586 | 1/1996 | Brash et al. ............................. | 710/112 |
| 5,737,240 | 4/1998 | Ellsworth et al. ...................... | 709/214 |
| 5,765,196 | 6/1998 | Liencres et al. ........................ | 711/143 |
| 5,845,130 | 12/1998 | Goff et al. ............................... | 710/240 |
| 5,922,057 | 7/1999 | Holt ......................................... | 710/52 |

*Primary Examiner*—Glenton B. Burgess
*Assistant Examiner*—Abdullahi E. Salad
*Attorney, Agent, or Firm*—Robert M. Sullivan

[57] ABSTRACT

A data processing system provides a method and apparatus for managing a shared resource between multiple processors. The data processing system includes a first processor for producing, or supplying, available sections of the shared resource, and a second processor for consuming, or allocating, the available sections within the system. The first and second processor share a memory containing a circular queue, a resource queue, for referencing available shared resource sections. The resource queue is initialized by storing a pointer to an available shared resource section in each entry of the resource queue. The second processor consumes an available section of shared resource by removing a resource pointer from a resource queue entry and sending a message signal to a mailbox message subsystem of the first processor. The first processor produces an additional section of available shared resource by servicing the resource message signal and adding a pointer to the additional shared resource section in an empty resource queue entry.

21 Claims, 4 Drawing Sheets

MANAGING A SHARED RESOURCE IN A MULTI-PROCESSOR SYSTEM

FIELD OF THE INVENTION

The present invention relates generally to data processing systems, and more particularly, to techniques for managing a resource shared by multiple processors within the data processing system.

BACKGROUND OF THE INVENTION

Data processing systems typically comprise a central processing unit, having one or more processors, for managing the movement of information, or data, between different peripheral units, or devices. These multi-processor systems often segregate system tasks among the processors to improve the performance, and the efficiency, of the overall data processing system. Although the system tasks may be divided among the processors, the data processing system may also include a shared resource, such as a shared memory. The management of this shared resource requires communication between the processors. A typical practice provides a first processor for supplying the resource, such as memory buffers partitioned within the shared memory, and a second processor for consuming the resource, such as allocating the memory buffers to specific tasks within the system.

In such multi-processor systems with shared resources, the first processor must notify the second processor when resources become available. Likewise, the second processor must notify the first processor when resources are used, or allocated, and additional resources are needed, or required. If the resources are critical to the performance, or operation, of the data processing system, each processor must notify the other in a minimal time period.

Current multi-processing systems, as disclosed in prior art, attempt to minimize the inter-processor communication delay by using a shared memory. In this technique, the processors use a section of the shared memory to store communication messages and control information. This section of the memory is dedicated as a communication mechanism for the processors, having data elements reserved for communication protocols, communication messages, and the status of particular events within the system. A special data element is often designated as a communication lock, to prevent a second processor from changing any of the data elements within the dedicated section of the shared memory while a first processor is modifying one or more of the data elements. The processors periodically poll the data elements within the dedicated section of the shared memory to determine whether any communications have been sent to them, or whether certain events have occurred in the system warranting their attention.

The shared memory approach to inter-processor communications contains certain disadvantages. The first processor, or the resource producer, is required to periodically poll the dedicated section of the shared memory even when the system needs no resources produced. Likewise, the second processor, or resource consumer, is required to poll the dedicated section of shared memory even when no resources are available for allocation, or consumption. This unwarranted polling of the communication section of the shared memory by the processors wastes time, introduces inefficiencies in the system, and reduces the overall performance of the multi-processing system.

As an alternative, current multi-processing systems may also use mailbox message techniques to provide communications between the processors. In this technique, each processor contains an associated mailbox, a memory attached to the processor and dedicated to receiving and queuing messages sent to the processor. Each processor includes a portion of its control program, a subprogram or subroutine, for managing its mailbox, often times referred to as a message handler. The message handler typically inspects the mailbox for incoming messages from other processors, and may also send outgoing messages to other processors. The message handler in each processor periodically executes, as scheduled within processor's control program, to manage the incoming and outgoing messages.

The mailbox typically stores the messages in the sequence in which they were received, similar to a first in, first out (FIFO) queue. The message handler services the message in the mailbox by transferring control to the portion of the processor's control program designed to respond to the message, or an event associated with the message. Some message handlers may service the messages in the order in which the messages reside in the mailbox. However, the message handler need not address the messages in that particular sequence. More sophisticated message handlers may use different rules to assign a priority to each message, and service the messages in a different sequence from which they were received in the mailbox.

One ordinarily skilled in the art can understand that the current mailbox message technique for inter-processor communications also includes some disadvantages. The message handler introduces significant overheads, measured in control instructions and processing cycles, when it periodically inspects the mailbox, and prioritizes the sequence in which messages are received. These processing overheads correspond to time delays, and performance inefficiencies, in the multi-processor system. In addition, messages unrelated to sharing resources may be processed prior to messages pertaining to the shared resources, thereby creating an additional time delay, and additional performance reduction, in the multi-processor system.

Accordingly, an improved system and method are needed for allowing multiple processors to manage shared resources within a data processing system.

SUMMARY OF THE INVENTION

An object of the present invention is to provide an improved method and system for allowing multiple processors to manage a shared resource within a data processing system.

Another object of the present invention is to provide an improved method and system for managing a shared resource in a data processing system, having multiple processors, by designating a first processor as a producer, or supplier, of the resource, and a second processor as a consumer, or allocator, of the resource.

An embodiment of the present invention provides a data processing system, having multiple processors and a shared resource, for managing the shared resource. The data processing system includes a first processor for producing, or supplying, available portions, or sections, of the shared resource, and a second processor for consuming, or allocating, sections of the shared resource within the data processing system. The data processing system further includes a memory shared between the first and second processor. The shared memory includes a resource queue which contains locations, or data elements, for storing a pointer to an available section of the shared resource. The resource queue also includes a head pointer and a tail pointer. The head pointer indicates which resource queue location points to the next available section of the shared resource to be consumed, or allocated, within the data processing system. The tail pointer denotes the resource queue location in which to store a pointer to an additional section of the shared resource when it becomes available. The resource queue is a circular queue and thus, the ending address wraps around to the starting address. Each processor contains a dedicated memory, or mailbox, for receiving incoming message signals and event signals. Each mailbox is coupled to a mailbox message subsystem. The mailbox message subsystem provides the processor an improved mechanism for servicing particular messages or events by qualifying, and thus prioritizing, particular incoming message and event signals.

Another embodiment of the present invention provides a method for allowing multiple processors to manage a shared resource within a data processing system. The method designates a first processor for producing, or supplying, available portions, or sections, of the shared resource, and a second processor for consuming, or allocating, sections of the shared resource within the data processing system. The first processor, or resource producer, initializes the resource queue by storing pointers to available sections of the shared resource in each data element of the resource queue. The second processor, or resource consumer, verifies that the resource queue is not empty, and then fetches the pointer to the next available section of the shared resource. The second processor uses the head pointer in the resource queue to access the next available shared resource section. The second processor then increments the head pointer, wrapping to the start of the resource queue, if necessary. The second processor finally sends a "resource consumed" message to the mailbox message subsystem associated with the first processor, notifying the first processor that the resource queue now has an unused data element in which to reference an additional available section of the shared resource.

The first processor subsequently receives the "resource consumed" message through its mailbox. The first processor then verifies that an unused data element exists within the resource queue. The first processor then locates an additional available section of the shared resource and stores a pointer to such section in the resource queue at the position designated by the tail pointer. The first processor increments the tail pointer, wrapping it to the starting address of the resource queue if necessary. If the first processor could not verify that the resource queue contained an unused data element, the first processor would then send an error message to the mailbox message subsystem associated with both processors.

The present invention affords its users with a number of distinct advantages. Importantly, the first processor, or resource producer, never needs to poll the shared memory to determine if it needs to supply an additional section of the shared resource. The first processor is also free to perform additional tasks until a "resource consumed" message is received in its mailbox. Thus, the resource producer need not produce resources until prompted by the appropriate message in its mailbox. In addition, the second processor, or resource consumer, need not process a mailbox message, and the corresponding overhead in processing time, to allocate a portion of the shared resource within the data processing system. The resource consumer also sends itself a "look for resource" message when it encounters an empty resource queue. Thus, the resource consumer need not continually poll the shared memory for additional resources once it encounters an empty resource queue.

The foregoing and other objects, features, and advantages of the invention will be apparent from the following more particular description of a preferred embodiment of the invention, as illustrated in the accompanying drawings.

DETAILED DESCRIPTION

Figure 1:
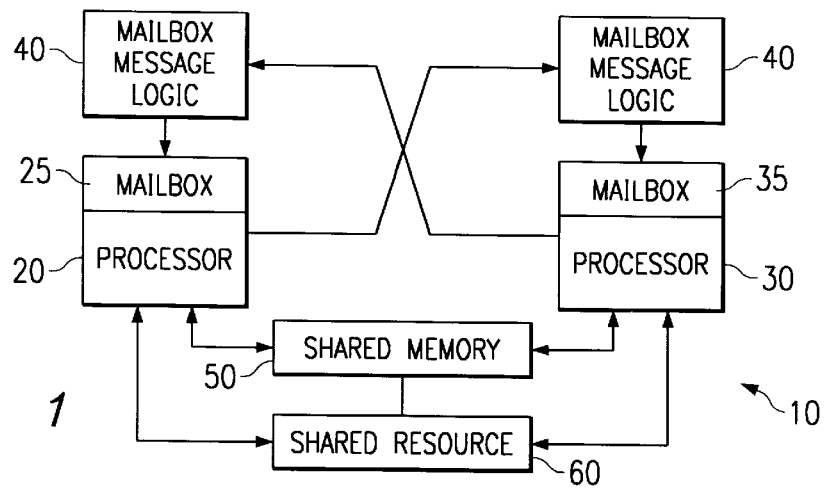
FIG. 1 is a block diagram showing an interconnection of functional components in a data processing system for managing a shared resource by multiple processors, in accordance with the present invention.

Referring more particularly to the drawings, like numerals denote like features and structural elements in the various figures. The invention will be described as embodied in a data processing system having multiple processors, and using a shared memory and a hardware mailbox message subsystem, to manage a shared resource. Turning now to FIG. 1, a data processing system 10 is shown comprising a first processor 20, a second processor 30, a mailbox message subsystem 40, a shared memory 50, and a shared resource 60. The first 20 processor is coupled to a first mailbox 25, and the second processor 30 is coupled to a second mailbox 35. The mailbox 25, 35 is a memory dedicated to the processor 20, 30, which stores incoming messages from peripheral circuitry connected to the processor, or from other processors. The incoming messages represent events to be reported to, and eventually serviced by, the processor 20, 30. The processor 20, 30 typically comprises a microprocessor, such as an IBM PowerPC, an Intel i960, or some similar component, and serves as the computing and decision-making center of the data processing system 10. The processor 20, 30 performs numerous tasks for the data processing system 10, such as coordinating the movement of information, or data, through the system 10, or managing various system resources. The processor 20, 30 executes control instructions comprising a control program. The control program is typically stored in a control storage, a separate and additional memory dedicated to the processor.

A mailbox message subsystem, or logic circuit, 40 is coupled to each of the mailboxes 25, 35 of the first 20 and second 30 processors. The mailbox message subsystem 40 generally receives incoming messages, and event signals, from peripheral units connected to the processor 20, 30. In particular, the mailbox message subsystem 40 depicted in FIG. 1 receives incoming messages from the alternate processor 20, 30. A shared memory 50 is coupled between the first 20 and the second 30 processor. The shared memory 50 typically provides a common control storage for the data processing system 10, and a means for coordinating individual tasks between the processors 20, 30 which service the data processing system 10. A shared resource 60 is coupled to the first processor 20, the second processor 30, and the shared memory 50. The shared resource 60 may include a storage for the data processing system 10, such as a cache memory, a non-volatile storage (NVS), or even a more permanent means of data storage, such as magnetic disk, magnetic tape, or optical disk.

Figure 2:
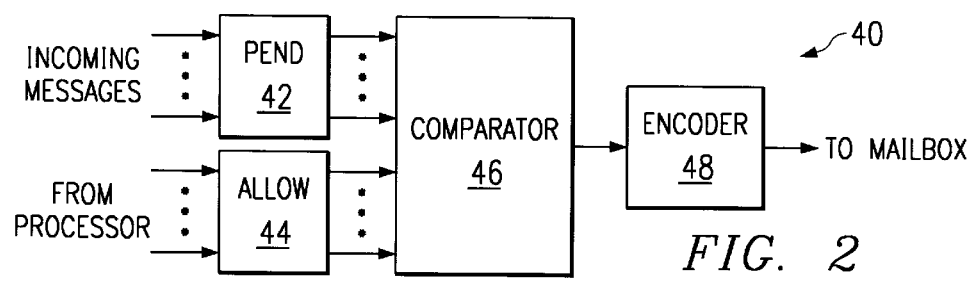
FIG. 2 is a block diagram showing the mailbox message subsystem as depicted in the data processing system of FIG. 1, in accordance with the present invention.

Referring to FIG. 2, a block diagram shows an exemplary mailbox message subsystem 40, for use in the present invention. A commonly-assigned patent application, U.S. Ser. No. 08/591,062, provides a more-detailed description of the hardware mailbox message technique used to capture peripheral events and efficiently propagate such event signals as messages to a processor's mailbox. Briefly, incoming message signals represent events which must be reported to, and ultimately serviced by, an associated processor 20, 30 within the data processing system 10. The events may be outputs from peripheral units connected to the processor 20, 30, or communications from other processors within the data processing system 10. The incoming message signals are coupled to input lines of a pending buffer 42, and latched as event signals within the pending buffer 42. The pending buffer 42 contains a data element for each unique incoming message signal, or event signal, to be reported to the associated processor 20, 30.

An allow buffer 44 provides the associated processor 20, 30 a technique for determining when a particular incoming message signal, or event signal, is qualified for servicing by the processor. The allow buffer 44 also contains a data element for each unique incoming message signal, or event signal, to be serviced by the associated processor 20, 30. The control program executing within the associated processor 20, 30 sets or resets each data element within the allow buffer 44 based on whether the corresponding incoming message signal is eligible for servicing by the processor 20, 30.

The pending buffer 42 and the allow buffer 44 are coupled to the inputs of a comparator 46. The comparator 46 is a circuit which compares pairs of inputs to determine when a particular incoming message signal is qualified to be serviced by the associated processor 20, 30. One signal of the pair represents whether a particular incoming message signal, or event signal, has occurred. If so, the corresponding data element in the pending buffer 42 will be set. The other signal of the pair represents whether the associated processor 20, 30 currently allows the same incoming message signal, or event signal, to be serviced. If the particular signal is eligible for servicing, the control program executing within the associated processor 20, 30 sets the corresponding data element within the allow buffer 44. The comparator 46 qualifies incoming message signals for servicing by comparing the data elements in the pending buffer 42 and the allow buffer 44 corresponding to the incoming message signal. Accordingly, the data elements in the pending buffer 42 and the allow buffer 44 must be concurrently set to qualify the incoming message signal for servicing by the associated processor 20, 30.

The comparator 46 is further coupled to an encoder 48. When the comparator 46 detects that both data elements are set corresponding to an incoming message signal, it notifies the encoder 48 that a message should be built indicating that the incoming message signal is qualified for service by the associated processor 20, 30. The encoder 48 is coupled to the mailbox 25, 35 of the associated processor 20, 30. The encoder 290 transmits the message to the mailbox 25, 35. As previously stated, the mailbox 25, 35 is a dedicated memory coupled to the processor 20, 30 for storing a finite number of messages delivered to the processor.

During normal operation, the processor 20, 30 selects which incoming message signals, or event signals, are serviceable by setting and resetting the data elements within the allow buffer 44. Incoming message signals are latched as event signals into the pending buffer 42. The comparator 46 then compares the actual incoming message signals, in the pending buffer 42, with the serviceable event signals, in the allow buffer 44, to determine if any incoming messages qualify for servicing by the associated processor 20, 30. If an incoming message qualifies for servicing, the comparator 46 signals the encoder 48 that a message should be built. The encoder 48 constructs a corresponding message, and transmits this message to the associated mailbox 25, 35. The message remains stored in the mailbox 25, 35 until it is received, and serviced, by the associated processor 20, 30.

Figure 3:
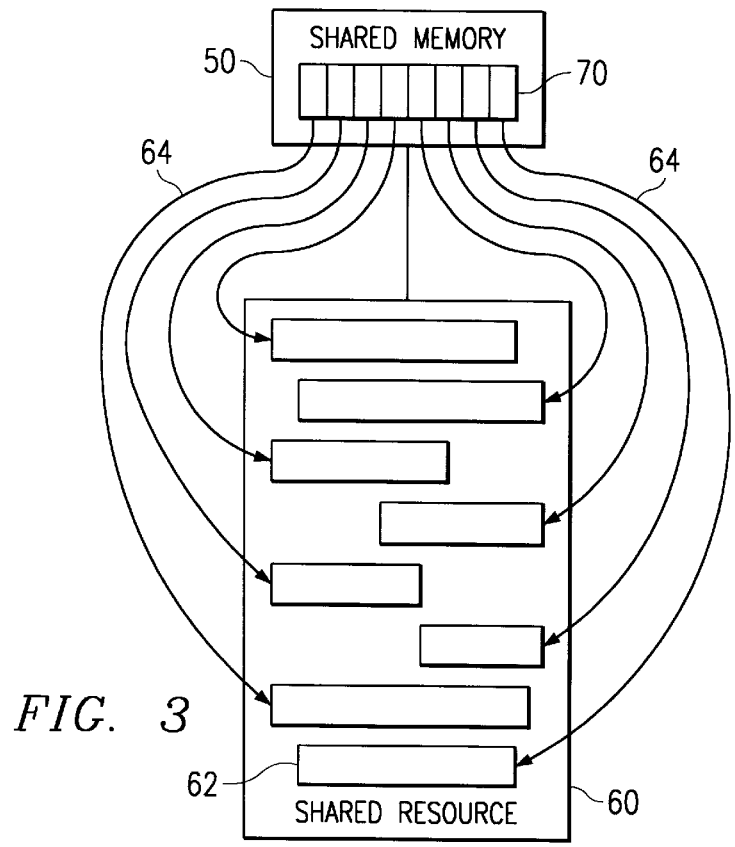
FIG. 3 is a block diagram showing the shared memory having pointers to section of the shared resource as depicted in the data processing system of FIG. 1, in accordance with the present invention.

Referring to FIG. 3, a block diagram is shown including the shared memory 50 and the shared resource 60 contained within the multi-processor data processing system 10 of FIG. 1. The shared memory 50 includes a resource queue 70, containing several data elements. Each data element contains a pointer 64 to a section 62 of the shared resource 60, such as a partition of cache memory. As depicted in FIG. 1, the shared memory 50 is coupled between the first 20 and the second 30 processor. The shared memory 50 provides a common control storage for the data processing system 10, and a means for coordinating individual tasks between the processors 20, 30. The shared resource 60 is also coupled to the shared memory 50 and the first 20 and second 30 processor. The resource queue 70 provides a mechanism for allocating portions 62 of the shared resource 60, and allows the first 20 and second 30 processors to coordinate the managing of the shared resource sections 62.

Figure 4A:
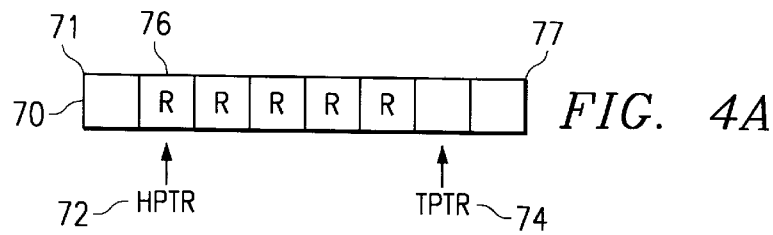
FIGS. 4A, 4B, and 4C are block diagrams showing a resource queue used in managing the shared resource as depicted in FIG. 1, in accordance with the present invention.
Figure 4B:
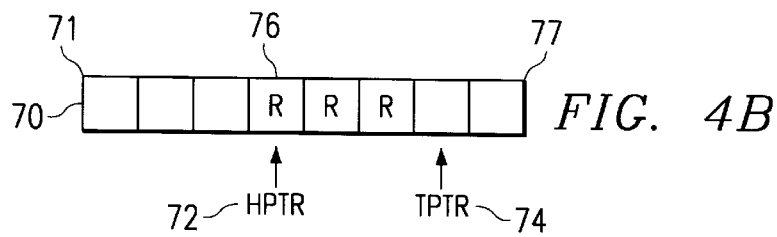
Figure 4C:
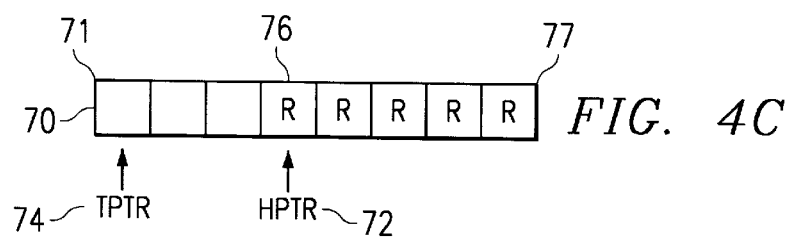

FIGS. 4A, 4B, and 4C, show block diagrams illustrating the resource queue 70 as a mechanism for managing the shared resource 60, and its sections 62. The resource queue 70 includes multiple data elements 76, each data element 76 for storing a pointer 64 to an available section 62 of the shared resource 60. The resource queue 70 is of finite length, and as such, contains queue start 71 and a queue end 77. The queue start 71 represents the starting address of the shared memory 60 reserved for the resource queue 70, and the queue end 77 represents the ending address. The resource queue 70 is a circular queue, and therefore, the queue end 77 wraps around to the queue start 71. The resource queue also includes a head pointer 72 and a tail pointer 74. The head pointer 72 points to the resource queue 70 location, or data element 76, which contains a pointer 64 representing the next available section 62 of shared resource 60 which will be consumed, or allocated. The tail pointer 74 points to the resource queue 70 location, or data element 76, which is currently empty, but in which a pointer 64 will be placed representing a next section 62 of shared resource 60 to be produced, or supplied.

In particular, FIG. 4A represents a situation where the tail pointer 74 is ahead of the head pointer 72, and multiple data elements 76 contain pointers 64 to a section 62 of the shared resource 60. FIG. 4B indicates the situation where shared resources 60 have been consumed, or allocated, within the data processing system 10. The head pointer 72 has advanced past several data elements 76, indicating that the pointers 64 to the corresponding shared resource sections 62 have been allocated, and are no longer available within the data processing system 10. FIG. 4C shows the situation where additional resources have been produced, or supplied, to the data processing system 10. The tail pointer 74 has advanced past several data elements 76, and wrapped past the queue end 77, indicating that pointers 64 to additional shared resource sections 62 are now available within the data processing system 10. In the present embodiment, a full resource queue 70 is indicated by the head pointer 72 pointing to one position ahead of the tail pointer 74. Accordingly, the resource queue 70 is empty when none of the data elements 76 contain pointers 64 to shared resource sections 62, and is so indicated when the head pointer 72 and the tail pointer 74 point to the same position in the resource queue 70. One ordinarily skilled in the art would realize that, because the resource queue is a circular queue, an alternate embodiment of the invention would indicate a full resource queue when the head and tail pointer are equal. In such alternate embodiment, an additional flag could be used to indicate whether the equal head and tail pointers indicated a full or an empty resource queue.

Figure 5:
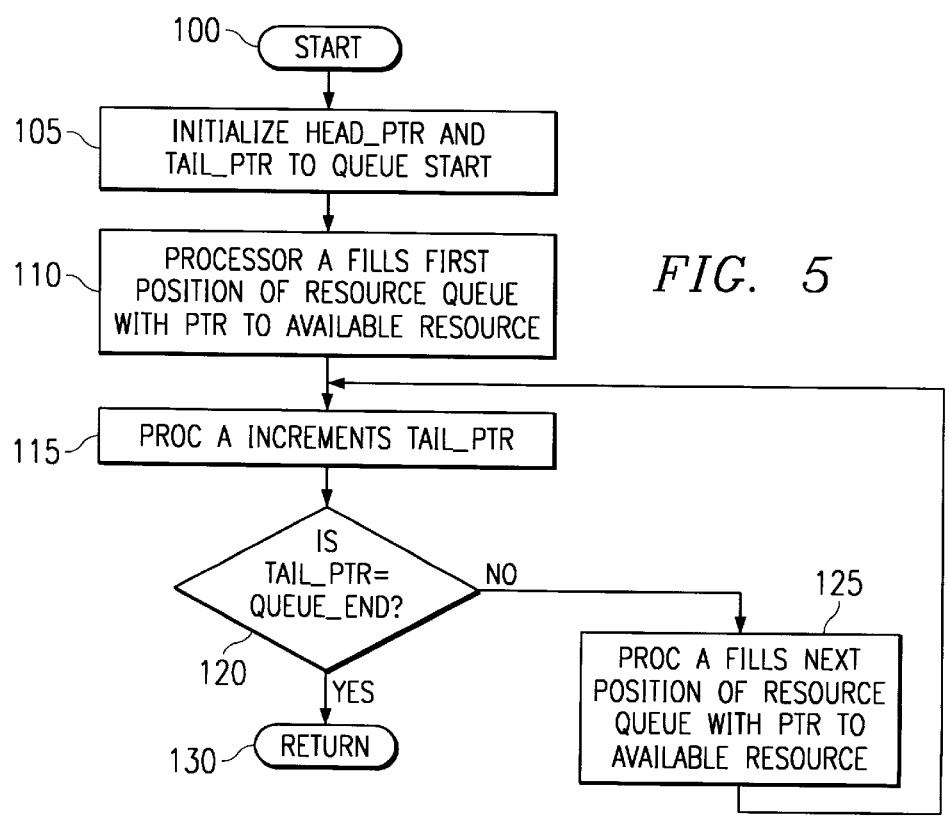
FIG. 5 shows a flow diagram depicting an illustrative sequence of operational steps to initialize the resource queue, in accordance with the present invention.

FIG. 5 describes a method 100, within the data processing system 10, for initializing the resource queue 70, such that the shared resource 60 may be managed among multiple processors 20, 30. In the current embodiment of the present invention, the first processor 20, or the resource producer, performs the method 100 for initializing the resource queue 70. One ordinarily skilled in the art, however, understands that either processor 20, 30 assigned to assist in managing the shared resource 60 could perform the steps of this method 100. A step 105 sets the head pointer 72 and the tail pointer 74 to the starting address of the resource queue 70, queue start 71. A step 110 places a pointer 64 to an available section 62 of the shared resource 60 in the first position, or first data element 76, of the resource queue 70. A step 115 increments the tail pointer 74 to the next position 76 in the resource queue 70. A step 120 determines whether the resource queue 70 is full by comparing the tail pointer 74 to the ending address of the resource queue 70, queue end 77. If not, step 125 places a pointer 64 to an additional available section 62 of the shared resource 60 in the next position, or data element 76, of the resource queue 70, and then continues to step 115 to again increment the tail pointer 74. Otherwise if the tail pointer 74 points to the queue end 77, the resource queue 70 is initialized, the head 72 and tail 74 pointers indicate a full resource queue containing pointers 64 to shared resource sections 62, and the method 100 completes at step 130.

Figure 6A:
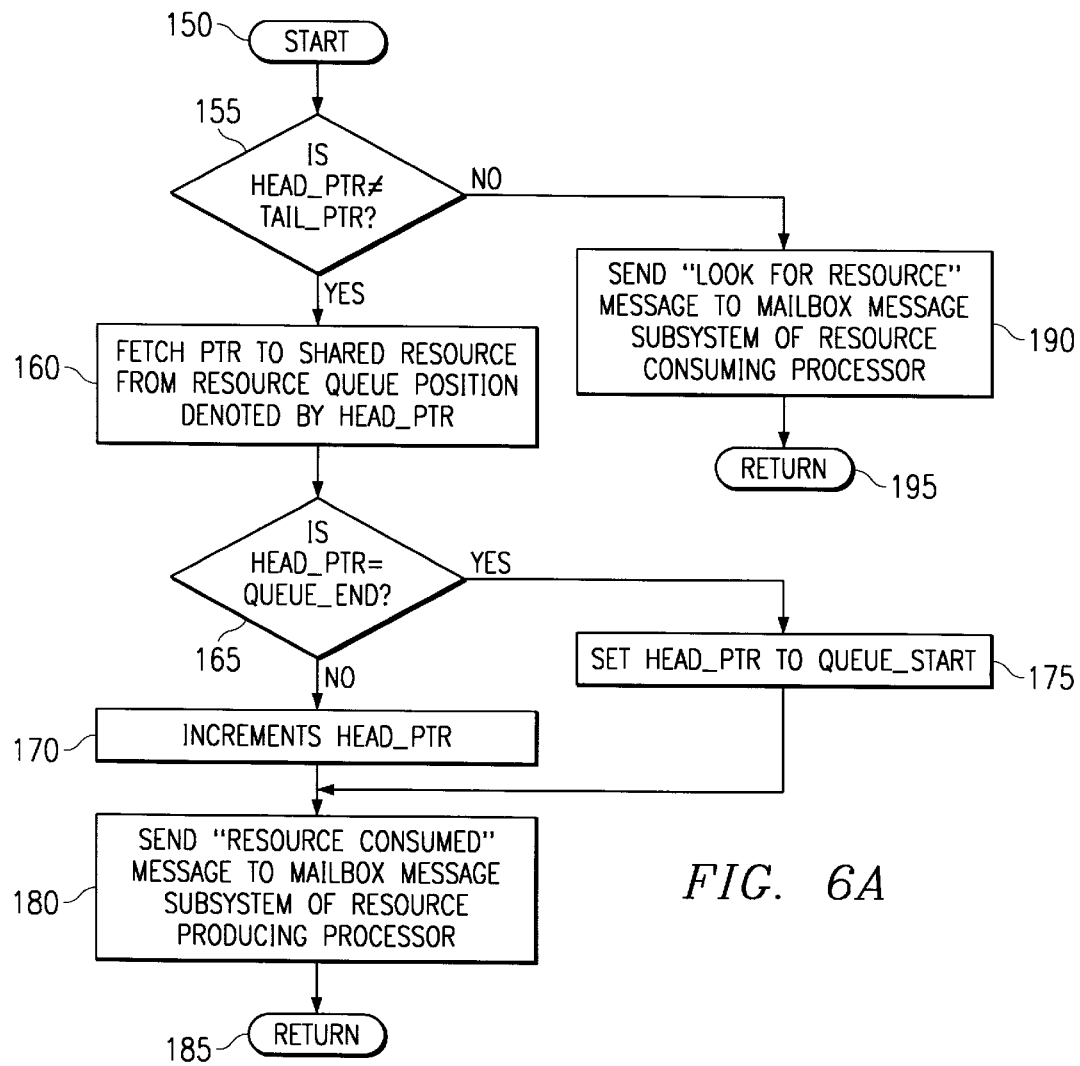
FIGS. 6A and 6B are flow diagrams showing an illustrative sequence of operational steps for multiple processors to manage the shared resource, by using the resource queue and the mailbox message subsystem, in accordance with the present invention.

FIG. 6A describes a method 150, within the data processing system 10, for consuming, or allocating, a portion of the shared resource 60. In the current embodiment, the second processor 30 is designated as the resource consumer, and performs the following method 150. One ordinarily skilled in the art, however, understands that either processor 20, 30 could be designated as the resource consumer and perform the following method steps. A step 155 determines whether the resource queue 70 is empty by comparing the head pointer 72 and the tail pointer 74. If empty, a step 190 sends an incoming message signal, a "look for resource" message signal, to the mailbox message subsystem 40 associated with the second processor 30, or the resource consumer. When subsequently serviced by the second processor 30 according to the description previously provided with the mailbox message subsystem 40 in FIG. 2, the message will prompt the second processor, or resource consumer, to repeat method 150 and again check the resource queue 70 for available shared resources 60. After step 190 sends the "look for resource" message, a step 195 returns from the method 150.

On the other hand, if the resource queue 70 is not empty, step 160 fetches a pointer 64 to the next available portion 62 of the shared resource 60. The head pointer 72 denotes which data element 76 in the resource queue 70 contains the pointer 64 to the next available shared resource section 62. A step 165 determines whether the head pointer 72 currently points to the queue end 77, the ending address of the resource queue 70. If so, a step 175 wraps the resource queue 70 by setting the head pointer 72 to the queue start 71, the starting address of the resource queue 70. Otherwise if the head pointer 72 does not point to the queue end 77, step 170 increments the head pointer 72 to the next resource queue location 76. Once the head pointer 72 is adjusted, a step 180 sends a "resource consumed" event message to the mailbox message subsystem 40 associated with the processor responsible for producing, or supplying, available portions of the shared resource 60. In the current embodiment, the first processor 20 serves as this resource producer. As previously described, the mailbox message subsystem 40 depicted in FIG. 2 provides an improved technique for delivering, and prioritizing, incoming message signals, and event signals, to the servicing processor. The "resource consumed" message notifies the resource producer that a portion 62 of the shared resource 60 was allocated in the data processing system 10, and an additional available shared resource section 62 can be placed in the resource queue 70. After the "resource consumed" message is sent, a step 185 returns from the method 150.

Figure 6B:
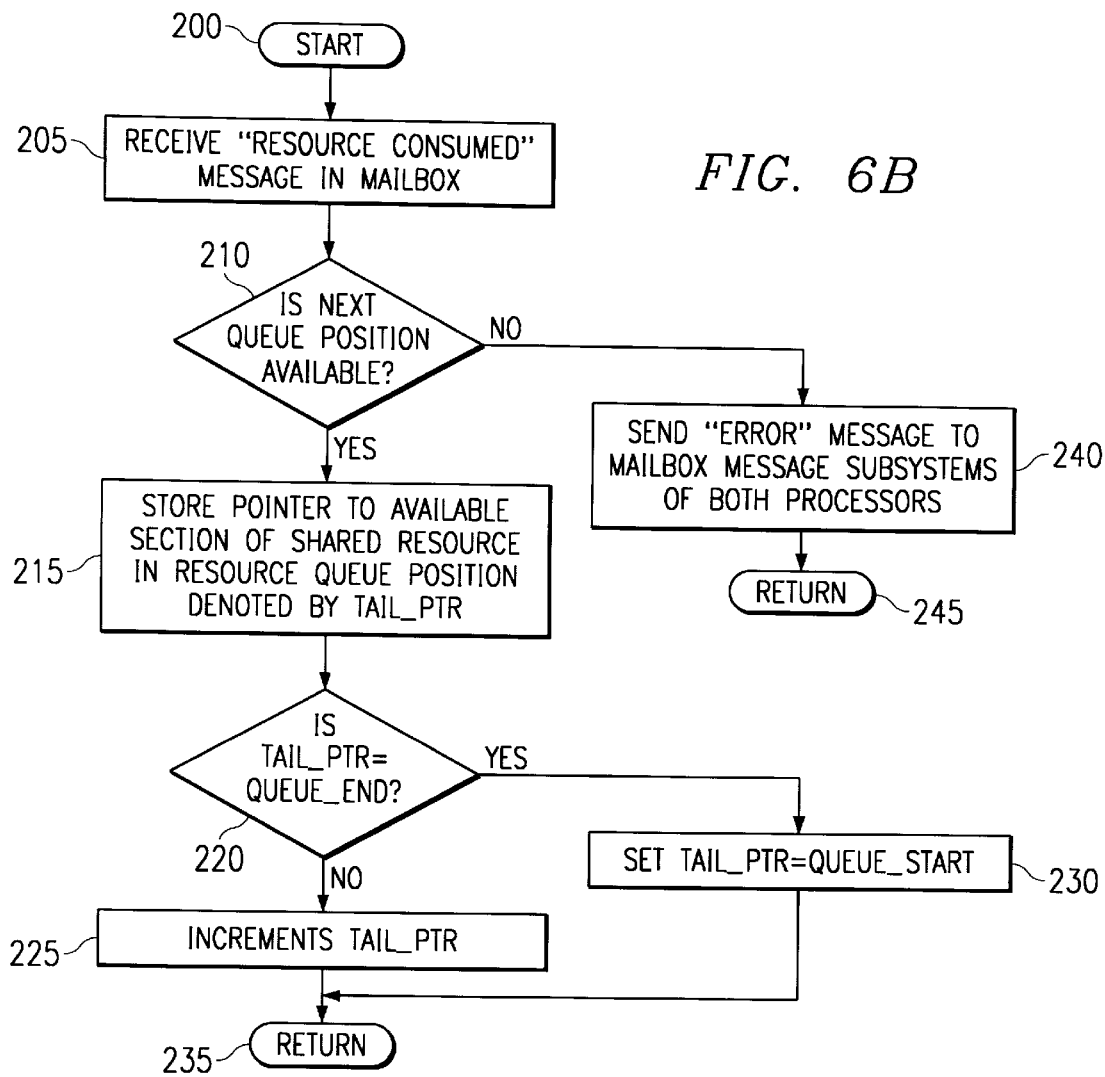

FIG. 6B describes a method 200, within the data processing system 10, for producing, or supplying, a portion of the shared resource 60. In the current embodiment, the first processor 20 is responsible for producing available sections 62 of the shared resource 60, and performs the following method 200 steps. One ordinarily skilled in the art, again, understands that either processor 20, 30 could be designated as the resource producer and perform the following method steps. A step 205 receives the "resource consumed" message, previously sent by the resource consumer, the second processor 30 in the current embodiment. As previously described, the mailbox message subsystem 40 provides a mechanism whereby the first processor 20 can qualify particular incoming message signals for servicing by setting the corresponding data elements in the allow buffer 44. The "resource consumed" message again denotes that an additional section 62 of the shared resource 60 can be made available by placing its pointer in the next available data element 76 of the resource queue 70.

A step 210 determines whether the next resource queue location 76 is available for inserting a pointer 64 to an available section 62 of shared resource 60. If not, a step 240 sends error messages to the mailbox message subsystems 40 associated with both processors 20, 30 responsible for managing the shared resource 60 within the data processing system 10. A step 245 then returns from the method 200 after sending the error messages. Otherwise if the next resource queue location 76 is available, a step 215 stores a pointer 64 to an available section 62 of the shared resource 60 in the resource queue location 76 pointed to by the tail pointer 74. A step 220 compares the tail pointer 74 to the queue end 77 to determine if the tail pointer 74 points to the ending address of the resource queue 70. If so, a step 230 wraps the resource queue 70 to its starting address in the shared memory 50 by setting the tail pointer 74 to the queue start 71. Otherwise, a step 225 simply increments the tail pointer 74 to the next resource queue location 76. Once the tail pointer 74 is adjusted, a step 235 returns from the method 200.

Figure 7:
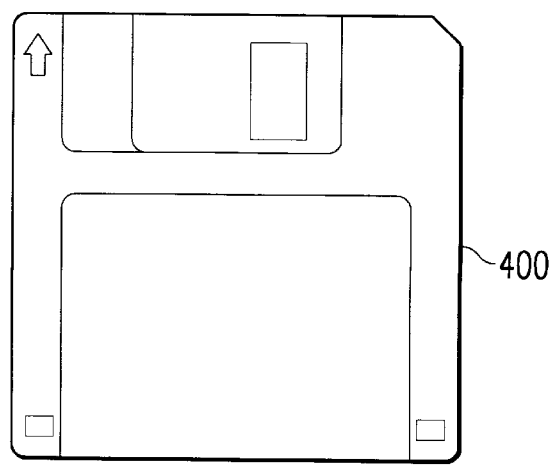
FIG. 7 shows an exemplary article of manufacture, in accordance with the present invention.

FIG. 7 depicts a storage medium 400 for storing executable computer instructions, such as a magnetic diskette, an optical disk cartridge, or a magnetic tape cartridge. This figure also represents memories used to store executable computer instructions, such as read-only memory (ROM) or programmable memory (PROM). The requirement for these storage mediums or memories is that they store digital representations of computer executable instructions.

Using the foregoing specification, the invention may be implemented as a machine, process, or article of manufacture by using standard programming or engineering techniques to produce computer software, firmware, hardware, or a combination thereof. Any resulting programs may be embodied within one or more computer usable media such as memory devices or transmitting devices, thereby making a computer program product or article of manufacture according to the invention. As such, the terms "article of manufacture" and "computer program product" as used in the following claims are intended to encompass a computer program existing on any memory device or in any transmitting device. Memory devices include fixed (hard) disk drives, diskettes, optical disks, magnetic tape, and semiconductor memories such as ROM, PROM, etc. Transmitting devices include the internet, electronic bulletin board and message/note exchanges, telephone/modem-based network communication, hardwired/cable communication network, cellular communication, radio wave communication, satellite communication, and other stationary or mobile network systems and communication links. A computer program product as described above may be used by transmitting it via any of the foregoing transmitting devices.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the invention has been particularly shown and described with reference to preferred embodiments thereof, it will be understood by those skilled in the art that various changes in form and details may be made therein without departing from the spirit and scope of the invention.

What is claimed is:

1. A data processing system for managing a shared resource comprising:

a first processor for producing, or supplying, a plurality of available sections of said shared resource;

a first mailbox coupled to said first processor for receiving incoming message signals and event signals designated for servicing by said first processor;

a first mailbox message subsystem coupled to said first mailbox for qualifying selected incoming message signals for priority servicing by said first processor;

a second processor for consuming, or allocating, said plurality of said available sections of said shared resource; and a shared memory coupled between said first processor and said second processor, said shared memory including a resource queue having a queue start, a queue end, and a plurality of resource data elements, said resource data elements indicating which sections of said shared resource are currently designated as said available sections, wherein said first processor informs said second processor that an additional available section of said shared resource has been produced by using said resource queue, said second processor communicates to said first processor that a selected section of said shared resource has been consumed by sending an incoming message signal to said first mailbox messaging subsystem, and said first processor initializes said resource queue by storing a resource pointer in each said resource data element, said resource pointer pointing to said available section of said shared resource.

2. The data processing system in claim 1 wherein said resource queue further comprises:

a head pointer for selecting a head data element, said head data element indicating which said available section of shared resource will be next consumed; and a tail pointer for selecting a tail data element, said tail data element indicating which said available section of said shared resource was most recently produced.

3. The data processing system in claim 2 wherein said resource queue is a circular queue, such that said head pointer and said tail pointer wrap to said queue start when incrementing beyond said queue end.

4. The data processing system in claim 2 wherein said second processor consumes said available section of said shared resource by:

fetching said resource pointer from said head data element;

incrementing said head pointer; and sending a "resource consumed" message signal as said incoming message signal to said first mailbox message subsystem to be subsequently serviced by said first processor.

5. The data processing system in claim 4 wherein said first processor produces said additional available section of said shared resource by:

receiving said "resource consumed" message signal in said first mailbox;

storing said resource pointer to said additional available section of said shared resource in said tail data element; and incrementing said tail pointer.

6. The data processing system in claim 1 wherein said first mailbox message subsystem further comprises:

a pending buffer having a plurality of pending data elements for receiving said incoming message signals, each pending data element corresponding to a unique incoming message signal, said pending data elements indicating which of said incoming message signals are pending service by said first processor; and an allow buffer coupled to said first processor, said allow buffer having a plurality of allow data elements responsive to said first processor, said allow data elements indicating which allowable message signals are eligible for service by said first processor.

7. The data processing system in claim 6 wherein said first mailbox message subsystem further comprises:

a comparator coupled to said pending buffer and said allow buffer for comparing said allowable message signals with said incoming message signals to qualify said incoming message signals for priority servicing by said first processor; and an encoder coupled between said comparator and said first mailbox for encoding and transmitting a message to said first mailbox, said message denoting that said qualified incoming message signal can be serviced by said first processor.

8. A method for managing a shared resource between a first processor and a second processor in a data processing system comprising steps of:
  (a) said first processor initializing a resource queue within a shared memory, said shared memory coupled to said first processor and said second processor, said resource queue having a plurality of resource data elements, each resource data element including a resource pointer pointing to a currently available section of said shared resource;
  (b) said second processor selecting a next available section of said shared resource from said plurality of resource data elements within said resource queue;
  (c) said second processor allocating said next available section of said shared resource within said data processing system by removing said next available section from said selected resource data element within said resource queue;
  (d) said second processor sending a resource consumed message signal to a mailbox message subsystem, said mailbox message subsystem coupled to said first processor, said mailbox message subsystem further qualifying said resource consumed message signal among other incoming message signals for priority servicing by said first processor; and
  (e) said first processor supplying an additional available section of said shared resource, in response to said resource consumed message signal, by adding said additional available section to an available resource data element within said resource queue.

9. The method in claim 8 wherein said step (a) further comprises:
  said first processor further initializing said resource queue as a circular queue having a queue start and a queue end, said queue end wrapping to said queue start.

10. The method in claim 8 wherein said step (b) further comprises:
  said second processor maintaining a head pointer for selecting a head data element, said head data element containing said resource pointer identifying which said available section of shared resource will be next allocated within said data processing system.

11. The method in claim 8 wherein said step (e) further comprises:
  said first processor maintaining a tail pointer for selecting a tail data element, said tail data element containing said resource pointer identifying which said available section of said shared resource was most recently supplied.

12. The method in claim 11 wherein said step (c) further comprises:
  said second processor fetching said resource pointer from said head data element; and
  said second processor incrementing said head pointer, such that said head pointer wraps to said queue start when incrementing beyond said queue end.

13. The method in claim 12 wherein said step (e) further comprises:
  said first processor servicing said resource consumed message signal received in said mailbox message subsystem;
  said first processor storing said resource pointer to said additional available section of said shared resource in said tail data element; and
  said first processor incrementing said tail pointer, such that said tail pointer wraps to said queue start when incrementing beyond said queue end.

14. The method in claim 8 wherein step (d) further comprises:
  said mailbox messaging subsystem setting a pending data element to indicate said resource consumed message signal is pending service by said first processor;
  said mailbox messaging subsystem setting an allow data element to indicate said resource consumed message signal is eligible for service by said first processor; and
  said mailbox messaging subsystem comparing said pending data element and said allow data element to qualify said resource consumed message signal for priority servicing by said first processor.

15. An article of manufacture for use in a data processing system, said data processing system including a first processor and a second processor for managing a shared resource, said article of manufacture comprising a computer-readable storage medium tangibly embodying a program of executable computer instructions which may cause said first processor and said second processor to perform steps comprising:
  (a) said first processor initializing a resource queue within a shared memory, said shared memory coupled to said first processor and said second processor, said resource queue having a plurality of resource data elements, each resource data element including a resource pointer pointing to a currently available section of said shared resource;
  (b) said second processor selecting a next available section of said shared resource from said plurality of resource data elements within said resource queue;
  (c) said second processor allocating said next available section of said shared resource within said data processing system by removing said next available section from said selected resource data element within said resource queue;
  (d) said second processor sending a resource consumed message signal to a mailbox message subsystem, said mailbox message subsystem coupled to said first processor, said mailbox message subsystem further qualifying said resource message signals for priority servicing by said first processor; and
  (e) said first processor supplying an additional available section of said shared resource, in response to said resource consumed message signal, by adding said additional available section to an available resource data element within said resource queue.

16. The article of manufacture in claim 15 wherein said program of executable computer instructions may further cause said first processor to perform said step (a) by:
  initializing said resource queue as a circular queue having a queue start and a queue end, said queue end wrapping to said queue start.

17. The article of manufacture in claim 15 wherein said program of executable computer instructions may further cause said second processor to perform said step (b) by:
  maintaining a head pointer for selecting a head data element, said head data element containing said resource pointer identifying which said available section of shared resource will be next allocated within said data processing system.

18. The article of manufacture in claim 15 wherein said program of executable computer instructions may further cause said first processor to perform said step (e) by:

maintaining a tail pointer for selecting a tail data element, said tail data element containing said resource pointer identifying which said available section of said shared resource was most recently supplied.

19. The article of manufacture in claim 18 wherein said program of executable computer instructions may further cause said second processor to perform said step (c) by:

fetching said resource pointer from said head data element; and incrementing said head pointer, such that said head pointer wraps to said queue start when incrementing beyond said queue end.

20. The article of manufacture in claim 19 wherein said program of executable computer instructions may further cause said first processor to perform said step (e) by:

servicing said resource consumed message signal received in said mailbox message subsystem;

storing said resource pointer to said additional available section of said shared resource in said tail data element; and incrementing said tail pointer, such that said tail pointer wraps to said queue start when incrementing beyond said queue end.

21. The article of manufacture in claim 15 wherein said program of executable computer instructions may further cause said mailbox messaging subsystem to perform said step (d) by:

setting a pending data element to indicate said resource consumed message signal is pending service by said first processor;

setting an allow data element to indicate said resource consumed message signal is eligible for service by said first processor; and comparing said pending data element and said allow data element to qualify said resource consumed message signal for priority servicing by said first processor.

\* \* \* \* \*